US012321602B2

(12) United States Patent
Radi et al.

(10) Patent No.: US 12,321,602 B2
(45) Date of Patent: Jun. 3, 2025

(54) DISAGGREGATED MEMORY MANAGEMENT

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 26 days.

(21) Appl. No.: 18/232,224

(22) Filed: Aug. 9, 2023

(65) Prior Publication Data

US 2024/0393950 A1 Nov. 28, 2024

Related U.S. Application Data

(60) Provisional application No. 63/468,637, filed on May 24, 2023.

(51) Int. Cl.
*G06F 3/06* (2006.01)

(52) U.S. Cl.
CPC .......... *G06F 3/0611* (2013.01); *G06F 3/0631* (2013.01); *G06F 3/0653* (2013.01); *G06F 3/067* (2013.01)

(58) Field of Classification Search
CPC .... G06F 3/0611; G06F 3/0631; G06F 3/0653; G06F 3/067; G06F 12/084; G06F 12/0811; G06F 12/0837; G06F 12/0882; G06F 12/0871; G06F 12/0813; G06F 2212/1021
See application file for complete search history.

(56) References Cited

U.S. PATENT DOCUMENTS

| 9,823,840 | B1 | 11/2017 | Brooker et al. |
| 10,521,137 | B1 | 12/2019 | Xu et al. |
| 11,134,025 | B2 | 9/2021 | Billore et al. |
| 11,431,645 | B2 | 8/2022 | Zhou et al. |

(Continued)

FOREIGN PATENT DOCUMENTS

WO 2018086569 A1 5/2018

OTHER PUBLICATIONS

Pending U.S. Appl. No. 18/232,780, filed Aug. 10, 2023, entitled "Disaggregated Memory Management for Virtual Machines", Marjan Radi.

(Continued)

*Primary Examiner* — Tracy C Chan
(74) *Attorney, Agent, or Firm* — Barry IP Law, P.C.

(57) ABSTRACT

A server includes at least one local memory and communicates with one or more network devices that provide an external shared memory. A kernel space of the server is used to monitor memory usage by different applications executed by the server. A memory kernel module adjusts usage of the at least one local memory and the external shared memory by the different applications based at least in part on the monitored memory usage. In another aspect, a memory access profiling server receives memory information and application usage information added to packets sent between servers and one or more memory devices. The memory access profiling server analyzes the memory information and application usage information to determine memory placement information that is sent to at least one server to adjust usage of the external shared memory.

20 Claims, 6 Drawing Sheets

(56) References Cited

U.S. PATENT DOCUMENTS

| | | | | |
|---|---|---|---|---|
| 2013/0007755 A1* | 1/2013 | Chambliss | ............... | G06F 3/067 |
| | | | | 718/103 |
| 2014/0215459 A1 | 7/2014 | Tsirkin | | |
| 2016/0070496 A1* | 3/2016 | Cohen | ................... | G06F 3/0644 |
| | | | | 711/103 |
| 2017/0034297 A1* | 2/2017 | Waheed | ............... | H04L 43/0817 |
| 2019/0243762 A1* | 8/2019 | Birke | ................... | G06F 9/45533 |
| 2020/0322287 A1* | 10/2020 | Connor | ................... | H04L 47/32 |
| 2021/0191734 A1 | 6/2021 | Myrick et al. | | |
| 2021/0240616 A1* | 8/2021 | Stabrawa | ............ | G06F 12/0646 |
| 2022/0278911 A1 | 9/2022 | Padala et al. | | |
| 2023/0032137 A1 | 2/2023 | Arcangeli et al. | | |
| 2024/0054079 A1* | 2/2024 | Han | ................... | G06F 12/0882 |

OTHER PUBLICATIONS

Pending U.S. Appl. No. 18/233,223, filed Aug. 11, 2023, entitled "Data Transmission Scheduling for Disaggregated Memory Systems", Marjan Radi.

Al-Fares et al.; "Hedera: Dynamic Flow Scheduling for Data Center Networks"; Apr. 2010; available at: https://dl.acm.org/doi/10.5555/1855711.1855730.

Chen et al.; Resource abstraction and data placement for distributed hybrid memory pool; Nov. 2019; available at: https://link.springer.com/article/10.1007/s11704-020-9448-7.

Lebeane et al.; "Data Partitioning Strategies for Graph Workloads on Heterogeneous Clusters"; Nov. 2015; available at: https://ieeexplore.ieee.org/document/7832830.

Lee et al.; "MIND: In-Network Memory Management for Disaggregated Data Centers"; Oct. 2021; available at: https://arxiv.org/abs/2107.00164.

Neves et al.; "Black-box inter-application traffic monitoring for adaptive container placement"; Mar. 2020; available at: https://dl.acm.org/doi/10.1145/3341105.3374007.

Raza et al.; "A Priority Based Greedy Path Assignment Mechanism in OpenFlow Based Datacenter Networks"; Aug. 2020; available at: https://www.sciencedirect.com/science/article/abs/pii/S1084804520301272.

Schweissguth et al.; "Application-Aware Industrial Ethernet Based on an SDN-Supported TDMA Approach"; May 2006; available at: https://ieeexplore.ieee.org/document/7496496.

Vattikonda et al.; "Practical TDMA for Datacenter Ethernet"; Apr. 2012; available at: https://dl.acm.org/doi/10.1145/2168836.2168859.

Xie et al.; "Improving MapReduce Performance through Data Placement in Heterogeneous Hadoop Clusters"; Apr. 2010; available at: https://ieeexplore.ieee.org/document/5470880.

Zhong et al.; "BPF for Storage: An Exokernel-Inspired Approach"; May 2021; available at: https://arxiv.org/abs/2102.12922.

* cited by examiner

DISAGGREGATED MEMORY MANAGEMENT

CROSS-REFERENCE TO RELATED APPLICATION

This application claims the benefit of U.S. Provisional Application No. 63/468,637 titled "DISAGGREGATED MEMORY MANAGEMENT", filed on May 24, 2023, which is hereby incorporated by reference in its entirety.

BACKGROUND

Current trends in cloud computing, big data, and Input/Output (I/O) intensive applications have led to greater needs for large-scale shared memory systems. Memory disaggregation and pooling has been used to support efficient memory utilization and resource management in data centers and other networked computing environments to allocate different memory resources to active nodes in the network based on their need for memory.

Although memory disaggregation can allow heterogenous memory sharing between nodes, diverse performance characteristics of the different memory devices, such as differing read and write latencies and memory capacities, can require increased memory access monitoring to make efficient memory placement decisions. Such increased memory access monitoring becomes especially problematic for large-scale systems with heterogenous memory devices being accessed by a variety of applications with different access patterns.

Current data placement approaches are generally not suitable for such large-scale systems with a variety of different types of memory since the additional overhead for monitoring memory usage consumes significant system resources that can negatively affect system performance. In addition, existing data placement approaches are typically based on memory access predictions determined before application runtime. Such predefined models are not suitable for highly dynamic data centers and cloud architectures that provide memory for applications having frequently changing memory needs.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Environments

Figure 1:
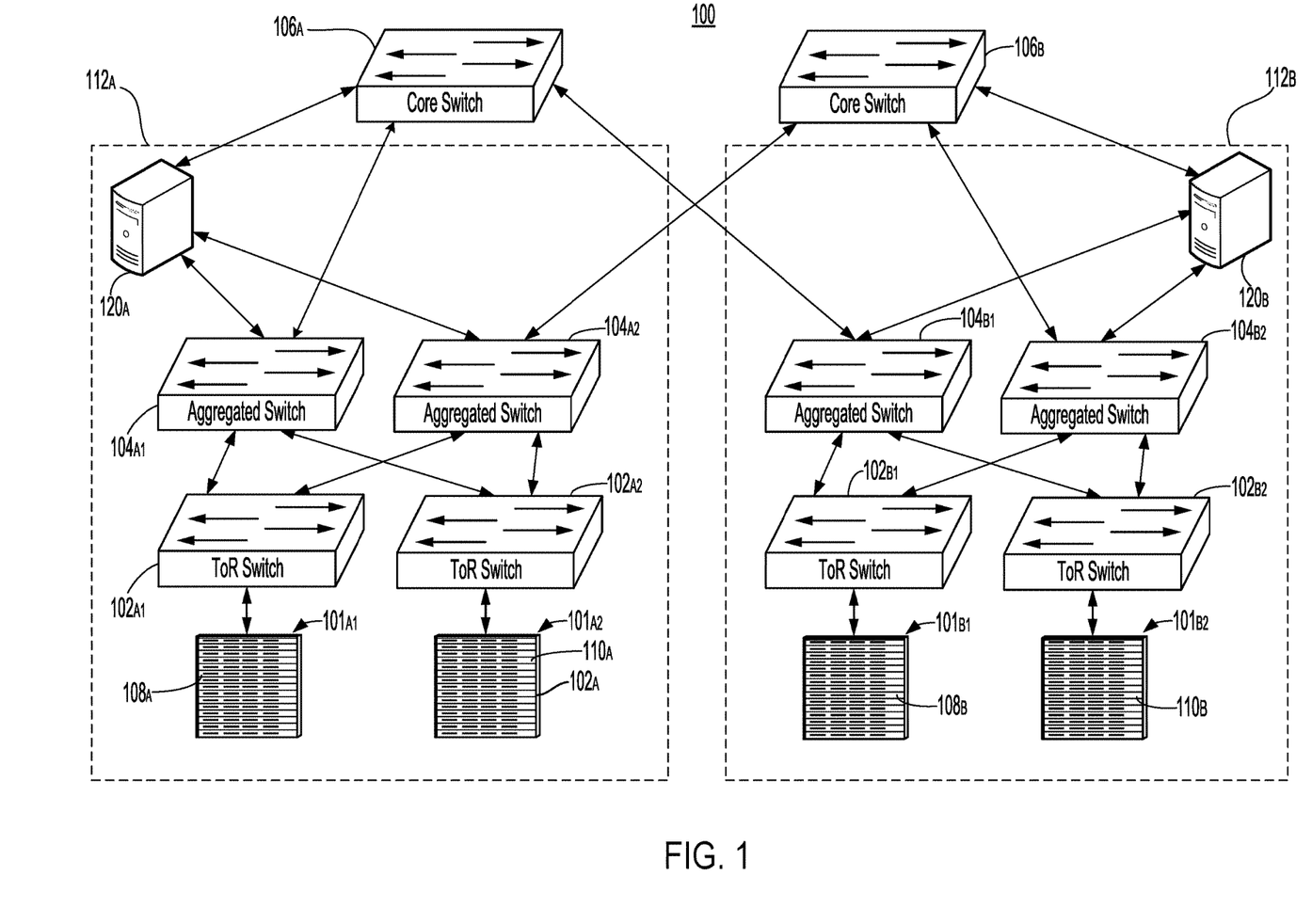
FIG. 1 is a block diagram of an example system for implementing disaggregated memory management according to one or more embodiments.

FIG. 1 illustrates an example system 100 for implementing disaggregated memory management according to one or more embodiments. As shown in FIG. 1, racks $101_{A1}$, $101_{A2}$, $101_{B1}$, and $101_{B2}$ use Top of Rack (ToR) switches $102_{A1}$, $102_{A2}$, $102_{B1}$, and $102_{B2}$, respectively, to communicate with network devices in system 100. Each rack 101 includes one or more network devices, such as servers $108_A$ and $108_B$ that can access shared memory in other network devices, such as memory devices $110_A$ and $110_B$ or another server providing shared memory. In some implementations, system 100 in FIG. 1 may be used as at least part of a data center and/or cloud architecture for applications executed by servers in system 100, such as for distributed machine learning or big data analysis.

Servers 108 can include, for example, processing nodes, such as Central Processing Units (CPUs), Application Specific Integrated Circuits (ASICs), Graphics Processing Units (GPUs), or other processing units that execute applications that access memory that may be local to the server and/or external to the server, such as an external shared memory at a memory device 110. In this regard, memory devices 110 can include, for example, Solid-State Drives (SSDs), Hard Disk Drives (HDDs), Solid-State Hybrid Drives (SSHDs), ASICs, Dynamic Random Access Memory (DRAM), or other memory devices, such as solid-state memories, that are made available to servers in system 100.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, Electrically Erasable Programmable Read Only Memory (EEPROM), other discrete Non-Volatile Memory (NVM) chips, or any combination thereof. In other implementations, memory devices 110 and/or servers 108 may include Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

The network devices in system 100 can communicate via, for example, a Storage Area Network (SAN), a Local Area Network (LAN), and/or a Wide Area Network (WAN), such as the Internet. In this regard, one or more of racks 101, ToR switches 102, aggregated switches 104, core switches 106, and/or memory access profiling servers 120 may not be physically co-located. Racks 101, ToR switches 102, aggregated switches 104, core switches 106, and/or memory access profiling servers 120 may communicate using one or more standards such as, for example, Ethernet and/or Non-Volatile Memory express (NVMe).

As shown in the example of FIG. 1, each of racks $101_{A1}$, $101_{A2}$, $101_{B1}$, and $101_{B2}$ is connected to a ToR switch or edge switch 102. In other implementations, each rack 101 may communicate with multiple ToR or edge switches 102 for redundancy.

Aggregated switches $104_{A1}$ and $104_{A2}$ route messages between the ToR switches 102A and core switch 106A and memory access profiling server $120_A$. In some implementations, racks $101_{A1}$ and $101_{A2}$ with ToR switches $102_{A1}$ and $102_{A2}$, aggregated switches $104_{A1}$ and $104_{A2}$, and memory access profiling server $120_A$ form cluster $112_A$ of network devices in system 100.

Similarly, aggregated switches $104_{B1}$ and $104_{B2}$ route messages between the ToR switches 102B and core switch 106B and memory access profiling server $120_B$. In some implementations, racks $101_{B1}$ and $101_{B2}$ with ToR switches $102_{B1}$ and $102_{B2}$, aggregated switches $104_{B1}$ and $104_{B2}$, and memory access profiling server $120_B$ form cluster $112_B$ of network devices in system 100. Core switches 106A and 106B can include high capacity, managed switches that route messages between clusters $112_A$ and $112_B$.

Those of ordinary skill in the art will appreciate that system 100 can include many more network devices than those shown in the example of FIG. 1. For instance, system 100 may include other clusters of racks 101, ToR switches 102, aggregated switches 104, and/or memory access profiling servers.

Memory access profiling servers 120 can update or affect memory placement decisions for applications being executed by servers in clusters $112_A$ and $112_B$. In some implementations, one or both of memory access profiling servers $120_A$ and $120_B$ may also serve as a Software Defined Networking (SDN) controller that manages control of data flows in system 100 between the switches. As discussed in more detail below, memory access profiling servers 120 can collect application usage information concerning the memory access of different applications executed by servers in their respective cluster 112. Memory access profiling servers 120 may use the application usage information and memory information concerning characteristics of the different memories available in their cluster to make data placement decisions that are sent to the servers executing the applications to adjust their usage of remote shared memory.

In addition, each server (e.g., a server 108) can use its own application usage information for the applications being executed by the server via one or more memory kernel modules to make data placement decisions for the applications executed by the server. Such data placement decisions can include, for example, whether to use the server's local memory or an external shared memory for an application, or whether to adjust the usage of the local memory or one or more external shared memories by the applications executed at the server. The one or more memory kernel modules may also request memory information from external shared memories at other network devices and make data placement decisions, such as migrating data from an external shared memory to the server's local memory.

Those of ordinary skill in the art will appreciate with reference to the present disclosure that other implementations may include a different number or arrangement of racks 101, ToR switches 102, aggregated switches 104, core switches 106, and memory access profiling servers than shown in the example of FIG. 1. In this regard, system 100 in FIG. 1 is for illustration purposes, and those of ordinary skill in the art will appreciate that system 100 may include many more racks 101, switches or routers than shown in the example of FIG. 1. In some variations, memory access profiling servers 120 may be omitted or one memory access profiling server 120 may be used for both clusters $112_A$ and $112_B$. As another example variation, system 100 can include a network controller that communicates with aggregated switches and/or core switches, such as an SDN controller. As noted above, memory access profiling servers 120 in some implementations may also serve as SDN controllers that manage control of the flows in system 100 among the switches.

Figure 2:
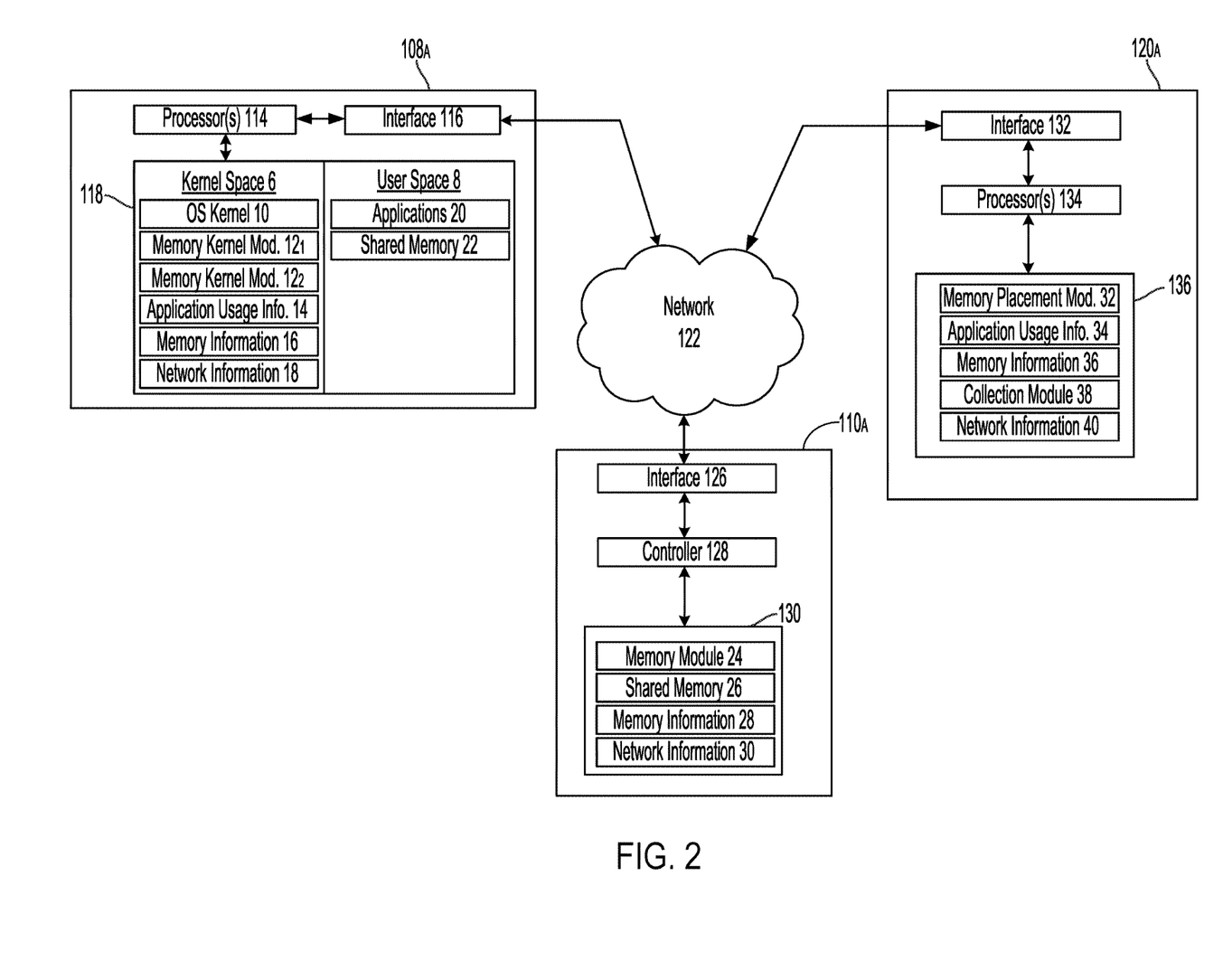
FIG. 2 is a block diagram of example devices in the system of FIG. 1 according to one or more embodiments.

FIG. 2 is a block diagram of example devices in system 100 of FIG. 1 according to one or more embodiments. As shown in FIG. 2, server $108_A$ includes one or more processors 114, memory 118, and interface 116 for communicating on network 122. Although only server $108_A$ is shown in the example of FIG. 2, other servers in system 100 may have similar or different components as server $108_A$.

Processor or processors 114 can execute instructions, such as instructions from Operating System (OS) kernel 10, which includes memory kernel modules $12_1$ and $12_2$, and application(s) 20. Processor(s) 114 can include circuitry such as one or more Reduced Instruction Set Computer (RISC)-V cores or other type of CPU core, a GPU, a microcontroller, a Digital Signal Processor (DSP), an ASIC, a Field Programmable Gate Array (FPGA), hard-wired logic, analog circuitry and/or a combination thereof. In some implementations, processor(s) 114 can include a System on a Chip (SoC), which may be combined with one or both of memory 118 and interface 116.

Interface 116 is configured to interface server $108_A$ with other devices on network 122. In this regard, network 122 can include switches (e.g., ToR switches 102, aggregated switches 104 and core switches 106 in FIG. 1) and routers, and the links between such switches and routers. Interface 116 may communicate using a standard such as, for example, Ethernet. As will be appreciated by those of ordinary skill in the art, interface 116 can be included as part of a processor 114. In some implementations, interface 116 can include, for example, a Network Interface Card (NIC), a smart NIC with its own processor and memory, a network interface controller, or a network adapter.

Memory 118 can include, for example, a volatile Random Access Memory (RAM) such as Static RAM (SRAM), DRAM, a non-volatile RAM, such as SCM, or other solid-state memory that is used by processor(s) 114 as an internal main memory to store and retrieve data. Data stored in memory 118 can include, for example, instructions loaded from memory kernel modules 12 or application(s) 20 for execution by processor(s) 114, and/or data used in executing such applications. In addition to loading data from memory 118 and storing data in memory 118, processor(s) 114 may also load data from and store data in external shared memory at other network devices. Such data may be flushed after modification by processor(s) 114 or evicted without modification back to memory 118 or to an external shared memory via interface 116.

As shown in FIG. 2, memory 118 of server $108_A$ includes kernel space 6 that is used by OS kernel 10 and user space 8 that is used by one or more user space applications 20. Kernel space 6 and user space 8 can include separate portions of virtual memory mapped to physical addresses in memory 118. As will be understood by those of ordinary skill in the art, access to kernel space 6 is generally restricted to OS kernel 10A, its kernel extensions, and other portions of an OS, such as device drivers, while access to user space 8 is available to application(s) 20 in addition to the OS. In this regard, the OS of server $108_A$ allocates hardware and software resources, such as memory, network, and processing resources of the server. In addition, shared memory 22 in user space 8 may be accessed for storing or retrieving data by applications executed by other servers in system 100, such as an application executed by server $108_B$ in cluster $112_B$ of FIG. 1.

In some implementations, memory kernel modules $12_1$ and $12_2$ can include extended Berkeley Packet Filter (eBPF) programs executed as an extension of the Linux kernel (Linux® is the registered trademark of Linus Torvalds in the U.S. and other countries). Notably, eBPF can enable reprogramming of the kernel behavior without requiring changes to the kernel source code or loading a kernel module. In addition, memory kernel modules $12_1$ and $12_2$ in some implementations can be offloaded from processor(s) 114 to a processor and memory of interface 116, such as in an implementation where interface 116 is a smart NIC with its own kernel space for executing an eBPF program. Such implementations can advantageously reduce the processing load of processor(s) 114 to free up memory and processing resources for application(s) 20 and OS kernel 10 executed by processor(s) 114.

Memory kernel module $12_1$ in the example of FIG. 2 monitors usage of shared memory 22 by different applications including locally executed application(s) 20 and any remotely executed applications that may be accessing shared memory 22. For its part, memory kernel module $12_2$ adjusts the usage of shared memory 22 by the application(s) executed by processor(s) 114 at server $108_A$ based at least in part on the monitored memory usage by application(s) 20. In this regard, shared memory 22 can serve as a local memory for server $108_A$ and its application(s) 20. In some implementations, the local memory of server $108_A$ can include multiple physical memory devices local to server $108_A$ or separate address spaces of a local memory device that may or may not be shared with other servers. In addition, memory kernel module $12_2$ can adjust the external shared memory usage of application(s) 20 at other network devices.

In some cases, memory kernel module $12_2$ may increase the amount of remote shared memory being used by application(s) due to an increase in memory usage by application(s) 20 that may exceed a threshold usage of local shared memory 22 or cause an application 20 to stall or wait due to not having enough locally available memory. In other cases, may shift more memory usage by application(s) 20 from remote shared memory to local shared memory 22 in response to memory placement information received from a memory access profiling server, such as memory access profiling server $120_A$ in FIG. 1. In such cases, the memory access profiling server may periodically provide updated memory placement information to server $108_A$ based on an analysis of memory information and application usage information for a larger group of devices, such as for devices in the racks of cluster $112_A$ in FIG. 1. In other cases, memory kernel module $12_2$ may shift usage from external shared memory to local shared memory 22 to improve performance if accessing local shared memory is faster than accessing a remote shared memory.

In this regard, memory kernel module $12_1$ generates or collects application usage information 14 in kernel space 6 with memory usage information or statistics generated or obtained by memory kernel module $12_1$ for the different applications 20 being executed by processor(s) 114. Advantageously, memory kernel modules $12_1$ and $12_2$ operation in kernel space 6 is transparent to application(s) 20 in user space 8 without requiring any changes to the applications while enabling the collection of memory usage statistics on a per-application basis. In addition, the operation of memory kernel modules $12_1$ and $12_2$ in kernel space 6 improves performance of memory placement decisions in terms of reducing latency and processing overhead since the application usage information and memory information originating from server $108_A$ and from network devices (e.g., at memory device $110_A$ or server $108_B$) do not need to travel through the full network and IO stacks of OS kernel 10 to reach an application in user space 8.

In some implementations, application(s) 20 can provide performance requirements to memory kernel module $12_1$ as part of its initialization via OS kernel 10. Such performance requirements can include, for example, a bandwidth requirement for the application and/or a latency value, such as a timeout value or other Quality of Service (QOS) requirement for the application. As discussed in more detail below with reference to FIG. 3, application usage information 14 can include, for example, Pressure Stall Information (PSI) for an application 20, a read count or read frequency for an application 20, a write count or write frequency for an application 20, a bandwidth requirement for an application 20, and/or a latency requirement or other QoS metric for an application 20. PSI may be provided as a kernel utility that tracks an amount or percentage of time that an application needed to wait or was stalled due to the lack of a resource, such as CPU time, available memory, or an Input-Output (IO) resource. Memory kernel module $12_1$ can collect PSI indicating a percentage of time that an application was stalled or had to wait due to a lack of available memory for the application during one or more recent timeframes. In addition, memory kernel module $12_1$ may identify read requests and write requests being handled by OS kernel 10 for incrementing a read count or write count for an application being executed by server $108_A$.

Application usage information 14 can be used by memory kernel module $12_2$ to adjust memory usage by different applications 20. For example, applications that issue more write or store commands may have its commands directed to local shared memory 22 or to an external shared memory at another network device that may have a lower write latency than another external shared memory that may have a higher write latency. As another example, data that is not frequently accessed or that may be associated with an application having a longer latency requirement or no latency requirement may be directed to storage device (e.g., an HDD) as opposed to an NVMe memory device suited to more frequent access with lower latency requirements.

As discussed in more detail below with reference to FIG. 4, memory information 16 can include information collected by memory kernel module $12_1$ in kernel space 6 about the memory available or currently being used by application(s) 20. Such information can include, for example, a type of the memory (e.g., SCM, SSD, NVMe), an amount of memory available, and/or an average queue length for commands waiting to be performed in the memory.

As with application usage information 14 discussed above, memory kernel module $12_2$ can adjust memory usage by different applications 20 based on memory information 16. For example, memory kernel module $12_2$ can shift memory usage from memories that have longer average queue lengths to memories with shorter average queue lengths to improve performance of application(s). In some implementations, memory information 16 can be updated by memory kernel module $12_1$ based on memory placement information received from memory access profiling server $120_A$ and/or from the network devices providing the external shared memory.

Network information 18 can include information about different network devices that provide remote shared memory and/or information about memory access profiling server $120_A$. For example, network information 18 may include network addresses for different memory devices or servers providing external shared memory with an identifier that corresponds to an identifier for the external shared memory in memory information 16.

Network information 18 may also include a network address for memory access profiling server $120_A$ that may be used by memory kernel module $12_1$ to report information to memory access profiling server $120_A$. In some implementations, memory kernel module $12_1$ can add at least a portion of application usage information 14 and/or memory information for local shared memory 22 to packets sent via interface 116 on network 122 that is collected or snooped by memory access profiling server $120_A$ for determining memory placement information. This arrangement reduces the communication overhead of sending and receiving messages between server $108_A$ and memory access profiling server $120_A$, which would be multiplied by many factors for a larger number of network devices in cluster $112_A$. In other implementations, network information 18 may be kept or maintained by interface 116 in a memory of interface 116, such as in an example where interface 116 is a smart NIC.

As shown in the example of FIG. 2, memory access profiling server $120_A$ includes interface 132 for communicating on network 122. Interface 132 may communicate using a standard such as, for example, Ethernet. As will be appreciated by those of ordinary skill in the art, interface 132 can be included as part of a processor 134. In some implementations, interface 132 can include, for example, a NIC, smart NIC, network interface controller, or network adapter.

Processor(s) 134 can execute instructions, such as instructions from memory placement module 32 and collection module 38. Processor(s) 134 can include circuitry such as one or more RISC-V cores or other type of CPU core, a GPU, a microcontroller, a DSP, an ASIC, an FPGA, hard-wired logic, analog circuitry and/or a combination thereof. In some implementations, processor(s) 134 can include an SoC, which may be combined with one or both of memory 136 and interface 132.

Memory 136 of memory access profiling server $120_A$ can include, for example, volatile RAM such as SRAM, DRAM, non-volatile RAM, such as SCM, or other solid-state memory that is used by processor(s) 134 as a main memory to store and retrieve data. Data stored in memory 136 can include, for example, instructions loaded from memory placement module 32 or collection module 38 for execution by processor(s) 134, and/or data used in executing such applications, such as application usage information 34, memory information 36, and network information 40. In some implementations, memory placement module 32 and collection module 38 may be combined into a single module.

As discussed in more detail below with reference to the memory placement process of FIG. 10, memory access profiling server $120_A$ can receive memory information and application usage information from servers and memory devices in cluster $112_A$, such as by snooping network traffic in finite epochs to aggregate application usage information and memory information into a global or at least cluster view of memory usage. Application usage information 34 and memory information 36 can include the same types of information as application usage information 14 and memory information 16 discussed above for server $108_A$, but for a wider range of devices, such as the servers and memory devices in cluster $112_A$. In some implementations, application usage information 34 and memory information 36 can be grouped on a per rack basis, such as for racks $101_{A1}$ and $101_{A2}$ in FIG. 1 for cluster $112_A$. In some implementations, memory access profiling server $120_A$ may also maintain application usage information and/or memory information for devices in cluster $112_B$.

In one implementation, memory access profiling servers $120_A$ and $120_B$ may exchange application usage information and memory information for the devices in their respective clusters 112 so that memory placement module 32 can make memory placement decisions for updating servers' memory placement decisions based on system-wide application usage information and memory information.

Collection module 38 collects the application usage information 34 and the memory information 36. In some implementations, memory monitoring module may operate in finite epochs or periods to snoop network traffic as discussed above to extract or parse out application access information and/or memory information that has been added to packets being sent between servers and memory devices. As discussed above, such piggybacking of application usage information (e.g., performance requirements of applications executed by a server generating a flow of data) and characteristics of shared memories (e.g., availability of shared memory at a memory device or server) can reduce the amount of network traffic and overhead in processing dedicated messages for exchanging such memory access information and memory information.

Memory placement module 32 determines memory placement information based at least in part on application usage information 34 and memory information 36. In analyzing application usage information 34 and memory information 36, memory placement module 32 in some implementations can analyze the collected information offline and inform servers on updates for memory placement decisions by periodically or occasionally sending determined memory placement decisions to adjust usage of shared memory by one or more applications executed by the server. In some implementations, memory placement module 32 may use a Machine Learning (ML) model to predict memory usage based on application usage information 34 and/or memory information 36. Such predictions may then be used by memory placement module 32 in determining the memory placement information sent to servers.

Network information 40 can be used by collection module 38 and memory placement module 32 to associate the received memory information and application usage information with particular devices or racks and in sending the determined memory placement information to the servers. In some implementations, network information 40 can include identifiers for devices or racks and their corresponding network addresses or range of network addresses, such as for a rack of devices (e.g., racks 101A in FIG. 1). In other implementations, network information 40 may be kept or maintained by interface 132 in a memory of interface 132, such as in an example where interface 132 is a smart NIC.

Memory device $110_A$ in the example of FIG. 2 includes interface 126, controller 128, and memory 130. Interface 126 may communicate via network 122 using a standard such as, for example, Ethernet. As will be appreciated by those of ordinary skill in the art, interface 126 can be included as part of controller 128. In some implementations, interface 126 can include, for example, a NIC, smart NIC, network interface controller, or network adapter.

Controller 128 can execute instructions, such as instructions from memory module 24, which monitors usage of shared memory 26 by network devices (e.g., servers 108) via network 122. Controller 128 can include circuitry such as one or more RISC-V cores or other type of CPU core, a GPU, a microcontroller, a DSP, an ASIC, an FPGA, hardwired logic, analog circuitry and/or a combination thereof. In some implementations, controller 128 can include an SoC, which may be combined with one or both of memory 130 and interface 126.

Memory 130 of memory device $110_A$ can include, for example, volatile RAM such as SRAM, DRAM, non-volatile RAM, such as SCM, or other solid-state memory that is used by servers 108 as an external or remote main memory to store and retrieve data for applications being executed by the server. In other implementations, memory device $110_A$ can include multiple shared memories that may provide different memory access capabilities such as faster read and/or write performance or larger capacity.

In monitoring usage of shared memory 26, memory module 24 generates or collects memory information 28, which may include information similar to memory information 16 discussed above for shared memory 22 of server $108_A$. Memory information 28 can include, for example, a type of memory for shared memory 26, an available memory capacity of shared memory 26 that can be written to by remotely executed applications, a count or frequency of read operations performed in shared memory 26 in a period of time, a count or frequency of write operations performed in shared memory 26 in a period of time, and one or more queue lengths for operations to be performed in shared memory 26, such as an average NVMe submission queue length, one or more read request queue lengths, and/or one or more write request queue length.

In addition, memory 130 may also store network information, which can provide network addresses for devices accessing shared memory 26. In some implementations, network information may instead be stored in a memory of interface 126, such as where interface 126 is a smart NIC with its own memory.

As will be appreciated by those of ordinary skill in the art with reference to the present disclosure, other implementations may include a different arrangement or number of components, or modules than shown in the example of FIG. 2. For example, in some implementations, server $108_A$ may not include a local shared memory 22 so that application(s) only use external shared memory. As another example variation, memory kernel modules $12_1$ and $12_2$ may be merged into a single memory kernel module that monitors application memory usage and also adjusts the usage of local and/or external shared memory by application(s) 20. In another example variation, server $108_A$ may include multiple different types of local memory available to application(s) 20 that may have different performance capabilities (e.g., different read and/or write latencies), some of which may not be available as shared memory to remote applications executed at another server.

Figure 3:
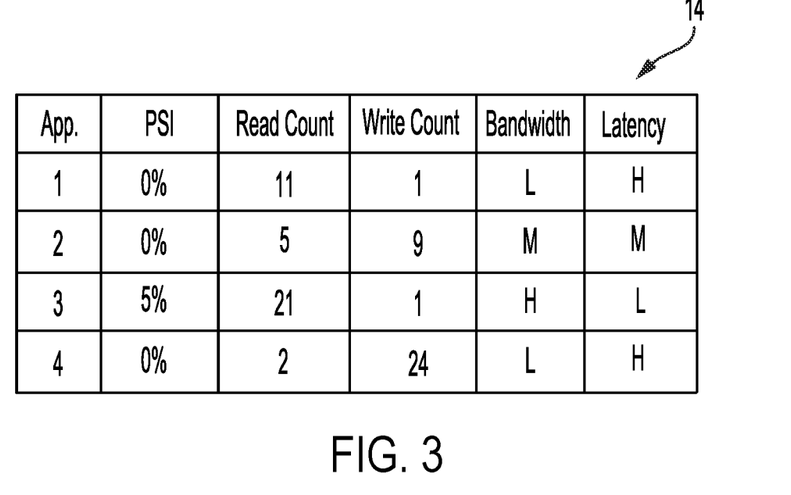
FIG. 3 illustrates an example of application usage information according to one or more embodiments.

FIG. 3 illustrates an example of application usage information 14 according to one or more embodiments. In the example of FIG. 3, application usage information 14 may be stored as a table or other type of data structure such as a Key Value Store (KVS) in kernel space 6 of server $108_A$. Application usage information 34 stored by memory access profiling server $120_A$ may include similar information as that shown for application usage information 14 of FIG. 3, but with usage information associated with applications executed throughout cluster $112_A$ on different servers. In this regard, application usage information 34 may further include an identifier for the server rack 101 and/or server executing the application associated with the memory usage information.

As shown in FIG. 3, application usage information 14 includes application identifiers that identify different applications being executed by server $108_A$. In some implementations, memory kernel module $12_1$ may also retain some previous application usage information in application usage information 14 or in a different data structure for previously executed applications to help predict or estimate future memory usage when an application is reinitiated. For example, if an application is initiated by OS kernel 10 and previous application usage information in application usage information 14 indicates that the application previously generated more write requests than read requests, memory kernel module $12_1$ may adjust memory usage to free memory that may have faster write performance.

In the example of FIG. 3, the application usage information created or aggregated by memory kernel module $12_1$ in application usage information 14 includes PSI as a percentage for each currently executed application, a read count for read requests generated by the application since initialization, a write count for write requests generated by the application since initialization, a bandwidth indicator for the application, and a latency indicator for the application. In other implementations, the read count and/or write count can be expressed as a read or write frequency or may represent a number or level of read requests or write requests generated by the application within a predetermined period of time.

As discussed above, the PSI can indicate a percentage of time that the application was stalled or had to wait due to a lack of available memory for the application during one or more recent timeframes. Memory kernel module $12_2$ may use this PSI to allocate more memory resources, whether local memory or external shared memory, for applications that are starved for memory, such as application 3 in the example of FIG. 3, which has been stalled 5% of a particular timeframe, such as in the past 60 seconds.

The read counts in application usage information 14 can indicate a number of read requests generated by the application since its initialization. In other implementations, the read counts may indicate a frequency of read requests generated by the application within a predetermined period of time, such as 60 seconds. In such implementations, the read count may indicate different levels of read frequencies (e.g., low, medium, and high) based on threshold numbers of read requests generated by the application within a predetermined period of time. Memory kernel module $12_2$ can use the read count information of application usage information 14 to allocate or assign memory with a lower read latency to applications that have a higher read count than other applications. For example, applications 1 and 3 in the example of FIG. 3 may be assigned memories that have a lower read latency since their memory usage is primarily for read requests.

The write counts in application usage information 14 can indicate a number of write requests generated by the application since its initialization. In other implementations, the write counts may indicate a frequency of write requests generated by the application within a predetermined period of time, such as 60 seconds. In such implementations, the write count may indicate different levels of write frequencies (e.g., low, medium, and high) based on threshold numbers of write requests generated by the application within a predetermined period of time. Memory kernel module $12_2$ can use the write count information of application usage information 14 to allocate or assign memory with a lower write latency to applications that have a higher write count than other applications. For example, application 4 with a higher write count may be assigned to a memory that has a lower write latency since its memory usage is primarily for write requests. By separately keeping track of read and write counts or frequencies for different applications, as in the example of FIG. 3, memory kernel module $12_2$ can better tailor its memory placement decisions to the different types of memory available as shared memory in system 100.

The bandwidth information in FIG. 3 can indicate a relative level of data written to and/or read from memory. For example, different threshold bandwidths such as a threshold amount of data per second may be used to compare to statistics generated by memory kernel module $12_1$ on an average data size accessed by the application during a predetermined period. In other implementations, the bandwidth for each application may be expressed as an actual amount of bandwidth used by the application, as opposed to the relative levels of bandwidth shown in FIG. 3 with low, medium, or high (i.e., L, M, and H in FIG. 3). In some implementations, memory kernel module $12_2$ may assign high bandwidth applications such as applications 1 and 3 in the example of FIG. 3 to a local memory for faster access of a larger share of data in a given period of time and to reduce network traffic resulting from larger data requests to access external shared memory. In some implementations, the applications may provide bandwidth information to OS kernel 10 when the application initializes.

The latency information in FIG. 3 can indicate a relative level of time sensitivity for the different applications. For example, different threshold time out values may be used to compare to information collected by memory kernel module $12_1$ on time out values for requests received by the kernel. In other implementations, a time out value for requests from each application may instead be expressed, as opposed to the relative levels of latency shown in FIG. 3 with low, medium, or high (i.e., L, M, and H in FIG. 3). In some implementations, memory kernel module $12_2$ may assign low latency applications such as application 3 in the example of FIG. 3 to a local memory or a faster type of remote shared memory for quicker memory access. Such low latency applications may include, for example, real-time applications such as for video streaming. In some implementations, the applications may provide latency requirements, such as a QoS or time out value for requests, to OS kernel 10 when the application initializes.

As will be appreciated by those of ordinary skill in the art with reference to the present disclosure, application usage information 14 may include different information than shown in FIG. 3. For example, some implementations of application usage information 14 may instead flag applications that have a PSI greater than 0 to indicate that the application has been starved of memory. As another example variation, other implementations of application usage information 14 can include read or write frequencies as opposed to read and write counts. In other variations, the bandwidth and/or latency requirements for each application may instead be actual values representing the required bandwidth and/or latency requirements for the application.

Figure 4:
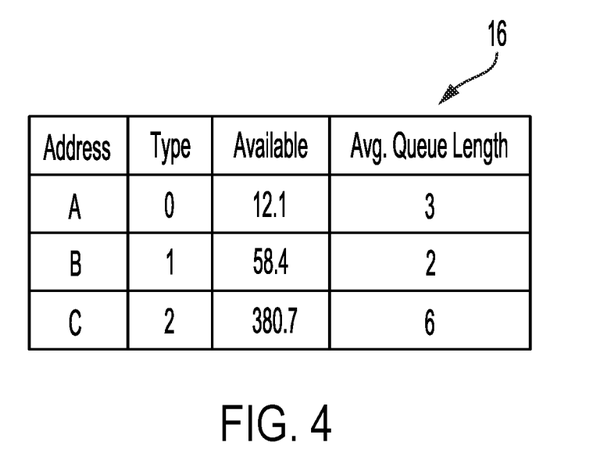
FIG. 4 illustrates an example of memory information according to one or more embodiments.

FIG. 4 illustrates an example of memory information 16 according to one or more embodiments. In the example of FIG. 4, memory information 16 may be stored as a table or other type of data structure such as a KVS in kernel space 6 of server $108_A$. Memory information 36 stored by memory access profiling server $120_A$ may include similar information as that shown for memory information 16 of FIG. 4, but with memory information associated with shared memories provided throughout cluster $112_A$ on different network devices. In this regard, memory information 36 may further include an identifier for the server rack 101 and/or network device providing the shared memory associated with the memory information. Similarly, memory information 28 stored by memory device $110_A$ can include similar information as that shown for memory information 16, but for shared memory 26 of memory device $110_A$.

In this regard, memory module 24 of memory device $110_A$ shown in FIG. 2 may collect or generate memory information 28 and provide at least a portion of memory information 28 to memory access profiling server $120_A$ by piggybacking the memory information on packets sent via network 122. In other implementations, memory device $110_A$ may periodically send updated memory information to memory access profiling server $120_A$ instead of adding memory information to other packets. In some implementations, memory information collected by memory access profiling server $120_A$ may periodically be sent to servers that access the shared memories as part of the data placement information so that the servers can update their locally stored memory information for the external shared memory used by its applications.

Memory kernel modules executed at different servers may also request memory information 28 or portions thereof in collecting its own memory information, such as memory information 16. In the example of FIG. 4, address A may correspond to local shared memory 22, while address B may correspond to an external shared memory located at server $108_B$, and address C may correspond to shared memory 26 at memory device $110_A$.

As shown in FIG. 4, memory information 16 includes an address for the shared memory, a type for the shared memory, an amount of available shared memory, and an average queue length for pending requests or commands to be performed in the shared memory. The types of memory can correspond to, for example, a DRAM, an NVMe flash memory, an HDD memory, or an SCM. As noted above, the different types of memory can have different characteristics such as different read and write latencies or different locations, such as whether the shared memory is local to the server or is accessed via the network. Memory kernel module $12_2$ may allocate shared memory that is local to server $108_A$ (e.g., shared memory 22) to applications that require a lower latency.

The available memory shown in memory information 16 indicates a remaining memory that is available as shared memory to be used by an application. In assigning shared memory to an application, memory kernel module $12_2$ may consider the bandwidth requirement of the application from application usage information 14 so that applications with larger memory needs can be assigned to shared memories that can support the larger memory needs of the application.

The average queue length in memory information 16 can indicate an average number of pending commands or requests that are waiting to be performed in the shared memory. In some implementations, the average queue length may correspond to an average NVMe submission queue length from among multiple NVMe submission queues. In other implementations, memory information 16 may include separate average queue lengths for read commands and for write commands so that memory kernel module $12_2$ can better match applications' memory usage needs with shared memories. For example, memory kernel module $12_2$ may assign an application with a larger write count to a shared memory that has a lower average queue length for write commands for faster performance of the write commands.

As will be appreciated by those of ordinary skill in the art with reference to the present disclosure, memory information 16 may include different information than shown in FIG. 3. In other implementations, individual read queues and write queues, or a single read queue and a single write queue may be used in memory information 16, as opposed to using an average queue length. As another example variation, memory information 16 may include an average completion time for requests originating from server $108_A$, which may be based on a time from when a request is sent from server $108_A$ until an acknowledgment is received from the network device hosting the shared memory that the request has been completed.

Example Processes

Figure 5:
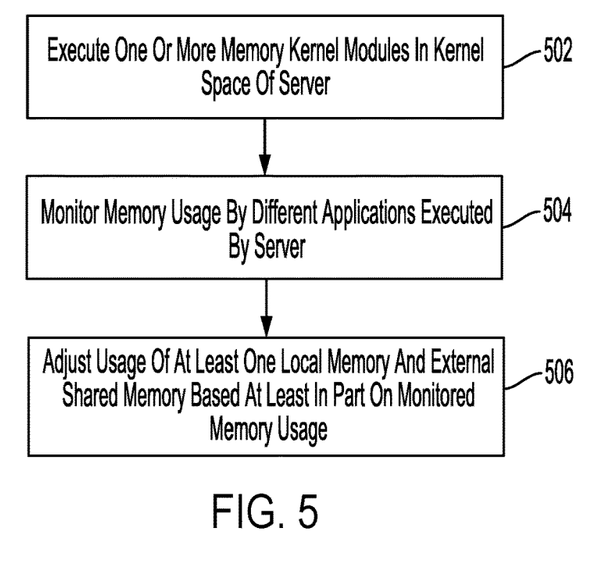
FIG. 5 is a flowchart for a memory adjustment process according to one or more embodiments.

FIG. 5 is a flowchart for a memory adjustment process according to one or more embodiments. The process of FIG. 5 can be performed by, for example, at least one processor 114 of server $108_A$ executing memory kernel modules $12_1$ and $12_2$.

In block 502, at least one processor of the server executes one or more memory kernel modules (e.g., memory kernel modules $12_1$ and $12_2$) in a kernel space of the server. The memory kernel module or modules may be part of an OS kernel executed by a processor of the server or by a processor of a smart NIC of the server.

In block 504, a memory kernel module monitors memory usage by different applications executed by the server. The monitoring can include collecting information about the application's memory usage, such as information provided by the application upon initialization, such as a data bandwidth needed by the application or a maximum latency for performing load and store operations by the application. The memory kernel module may also keep track of statistics during the application's operation, such as PSI for the application, and generate memory usage information such as a read count or read frequency for read commands issued by the application, and a write count or write frequency for write commands issued by the application.

In block 506, a memory kernel module of the server adjusts usage of at least one of a local memory and an external shared memory based at least in part on the memory usage monitored in block 504 for the different applications executed by the server. The adjustments to memory usage can include, for example, assigning or allocating different shared memories to different applications or reassigning or reallocating shared memories to different applications. In one example, an application may no longer be using shared memory and the shared memory can be reallocated to another application that may need more memory. In another example, a shared memory may become unavailable, and an application may need to be reassigned a different shared memory. As another example, an application may begin issuing more write commands and would be better suited to using a shared memory with a lower write latency than a currently used shared memory. In this regard, the kernel-based system for monitoring and adjusting memory usage can provide dynamic memory assignment that is tailored to the needs of the applications currently being executed by the server.

Those of ordinary skill in the art will appreciate with reference to the present disclosure that the memory adjustment process of FIG. 5 may be performed in a different order. For example, the performance of blocks 502, 504, and/or 506 may overlap as the memory kernel module or modules are executed in block 502, while application memory usage is monitored in block 504 and the usage of memory is adjusted in block 506.

Figure 6:
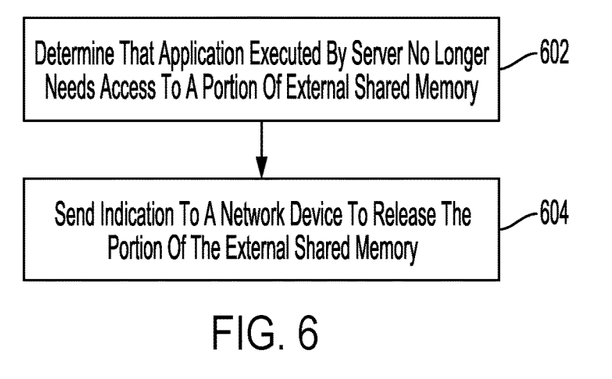
FIG. 6 is a flowchart for a memory release process according to one or more embodiments.

FIG. 6 is a flowchart for a memory release process according to one or more embodiments. The process of FIG. 6 can be performed by, for example, at least one processor 114 of server $108_A$ executing memory kernel module $12_2$.

In block 602, a memory kernel module at a server determines that an application being executed by the server no longer needs access to a portion of an external shared memory provided by a network device. In some cases, the application may have terminated, or the memory kernel module may have determined that the application should use a different memory, such as a local memory or a different external shared memory. The determination may be made as part of the memory adjustment process of FIG. 5 in some cases.

In block 604, the memory kernel module sends an indication to the network device to release the portion of the external shared memory that was used by the application. As discussed above, the use of memory kernel modules enables the allocation and reassignment of shared memory to be transparent to the applications so that the application does not have to handle any additional processing or overhead in reallocating the shared memory. The indication may include, for example, a release message following a particular protocol to release the addresses reserved for the application in the shared memory.

Figure 7:
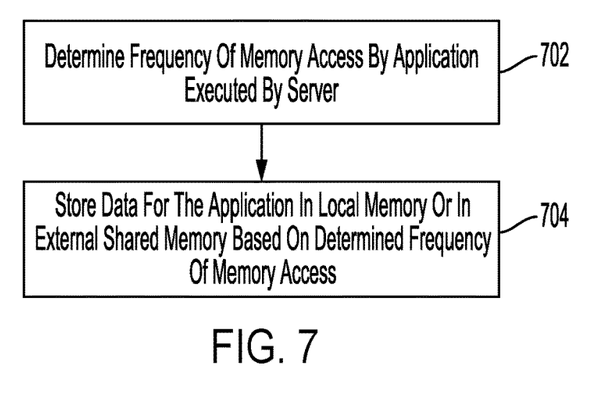
FIG. 7 is a flowchart for a memory selection process according to one or more embodiments.

FIG. 7 is a flowchart for a memory selection process according to one or more embodiments. The memory selection process of FIG. 7 may be performed, for example, by a processor 114 of server $108_A$ executing memory kernel modules $12_1$ and $12_2$.

In block 702, memory kernel module $12_1$ determines the frequency of memory access by an application executed by the server. The frequency of memory access may be determined by monitoring a kernel IO path for the application. In some implementations, the kernel module may also use application memory usage information from previous instances of executing the application to determine the frequency of memory access by the application. In some cases, the memory kernel module may consider both read and write access information for the application. In other cases, the memory kernel module may only consider read or write accesses for the application.

In block 704, memory kernel module $12_2$ stores data for the application in a local memory of the server or in an external shared memory based on the determined frequency of memory access from block 702. For example, the memory kernel module may determine that the frequency of memory access by the application exceeds a threshold amount of data or a threshold number of memory accesses in a predetermined period, such as 60 seconds. The one or more memory kernel modules may then store data for the application in a local memory to facilitate faster write performance and/or a greater bandwidth for the application.

In another example, the kernel module may determine that the frequency of memory access by the application has fallen below a threshold amount of data or a threshold number of memory accesses in a predetermined period. The memory kernel module may then store data for the application in an external shared memory to free up space in the local memory for other applications that may need a faster memory access or a greater bandwidth.

Those of ordinary skill in the art will appreciate with reference to the present disclosure that the memory selection process of FIG. 7 may be performed in a different order. For example, the performance of blocks 702 and 704 may repeat such that the storage of data for the application may switch from storage in a local memory to an external shared memory and back to the local memory based on updates to the frequency of memory access for the application.

Figure 8:
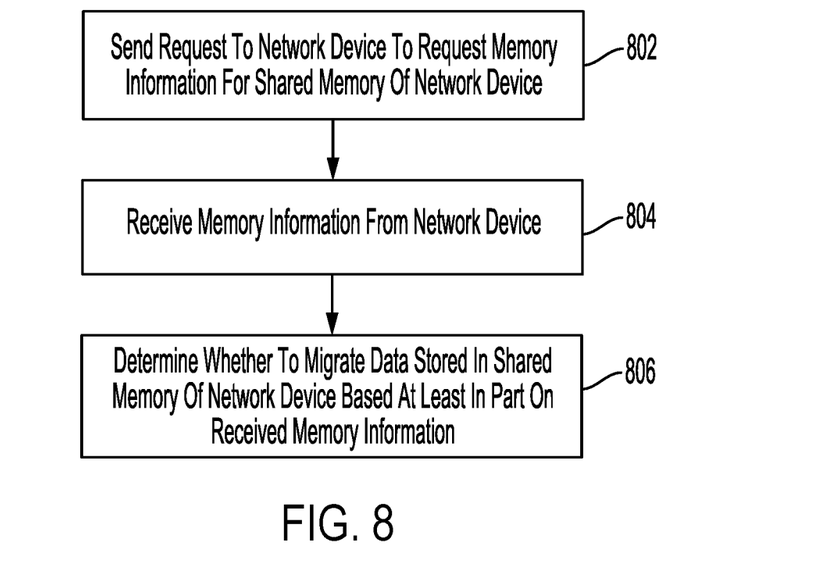
FIG. 8 is a flowchart for a data migration process according to one or more embodiments.

FIG. 8 is a flowchart for a data migration process according to one or more embodiments. The data migration process of FIG. 8 may be performed by, for example, at least one processor 114 of a server $108_A$ executing memory kernel modules $12_1$ and $12_2$.

In block 802, memory kernel module $12_1$ sends a request to a network device to request memory information for a shared memory of the network device where an application executed by the server has data stored. The memory information may include, for example, an available remaining memory for the shared memory or one or more queue lengths for pending commands waiting to be performed in the shared memory, as discussed above for memory information 16 with reference to FIG. 4.

In block 804, the memory kernel module receives the memory information from the network device. In block 806, memory kernel module $12_2$ determines whether to migrate data stored in the shared memory of the network device to a different memory based at least in part on the received memory information. For example, the application usage information collected by the memory kernel module may indicate that one or more applications will be accessing the external shared memory of the network device more frequently and an average queue length received as part of the memory information may indicate that operations to be performed in the shared memory are having to wait. The memory kernel module may then determine to migrate the data for the server's application(s) to another memory, such as a local memory or a different external shared memory that has a lower average queue length for pending commands.

Figure 9:
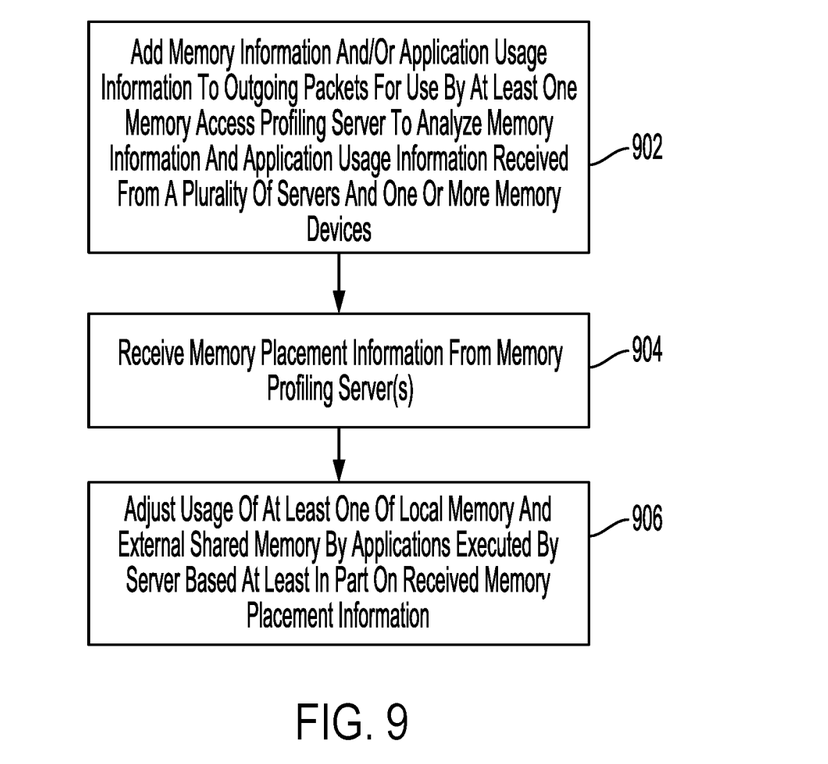
FIG. 9 is a flowchart for a memory adjustment process based on memory placement information received from a memory access profiling server according to one or more embodiments.

FIG. 9 is a flowchart for a memory usage process based on memory placement information received from a memory access profiling server according to one or more embodiments. The memory usage process of FIG. 9 may be performed by, for example, at least one processor 114 of a server $108_A$ executing memory kernel modules $12_1$ and $12_2$.

In block 902, memory kernel module $12_1$ adds memory information and/or application usage information to outgoing packets to be used by at least one memory access profiling server (e.g., memory access profiling server $120_A$ in FIGS. 1 and 2). As discussed above with reference to FIG. 3, the application usage information can include, for example, PSI for different applications executed by the server, read counts or read frequencies for different applications executed by the server, write counts or write frequencies for different applications executed by the server, bandwidth requirements (e.g., low, medium, and high) for different applications executed by the server, and/or latency requirements (e.g., low, medium, and high) for different applications executed by the server. In some implementations, the memory kernel module may periodically add or piggyback the application usage information to packets being sent by the kernel module for memory requests being sent to other network devices to access external shared memory.

If the server also has a shared memory that is made available to other servers, the kernel module(s) may also add memory information to packets sent by the server to other network devices. As discussed above with reference to FIG. 4, the memory information can include, for example, a type for the shared memory (e.g., flash memory, NVMe memory, SCM), an available memory capacity for the shared memory, and/or an indicator of one or more queue lengths for commands waiting to be performed in the shared memory.

The memory access profiling server may snoop or sniff the network traffic at finite epochs to collect the application usage information and memory information added to packets from the server, in addition to the application usage information and memory information added to packets from other network devices, such as other servers and memory devices. This information can then provide the memory access profiling server with a cluster-wide or system-wide view of memory access usage and shared memory characteristics. In other implementations, the memory kernel module of the server may send application usage information and/or memory information to the memory access profiling server in response to requests received by the memory access profiling server. As discussed in more detail below with reference to FIG. 10, the memory access profiling server can analyze the application usage information and memory information and provide servers with data placement information based on the analysis.

In block 904, memory kernel module $12_2$ receives memory placement information from one or more memory access profiling servers. For example, server $108_A$ in FIG. 1 may receive memory placement information from both memory access profiling server $120_A$ and memory access profiling server $120_B$ if server $108_A$ accesses shared memories in both clusters $112_A$ and $112_B$. The memory placement information can include, for example, changes to which external shared memories are accessed by applications executed by the server or changes to a transmission rate of packets for applications accessing an external shared memory. In some implementations, the memory placement information can also include memory information for shared memories that are accessed by applications executed at the server.

In block 906, memory kernel module $12_2$ adjusts usage of at least one of local memory and external shared memory by applications executed by the server based at least in part on received memory placement information. For example, the memory placement information may indicate that an application executed by the server should use a different external shared memory in place of a currently used external shared memory due to the currently used shared memory causing a bottleneck in performance for other applications being executed at other servers. Memory kernel module $12_2$ may then adjust the usage of the application executed at the server to the new external shared memory indicated by the received data placement information.

Figure 10:
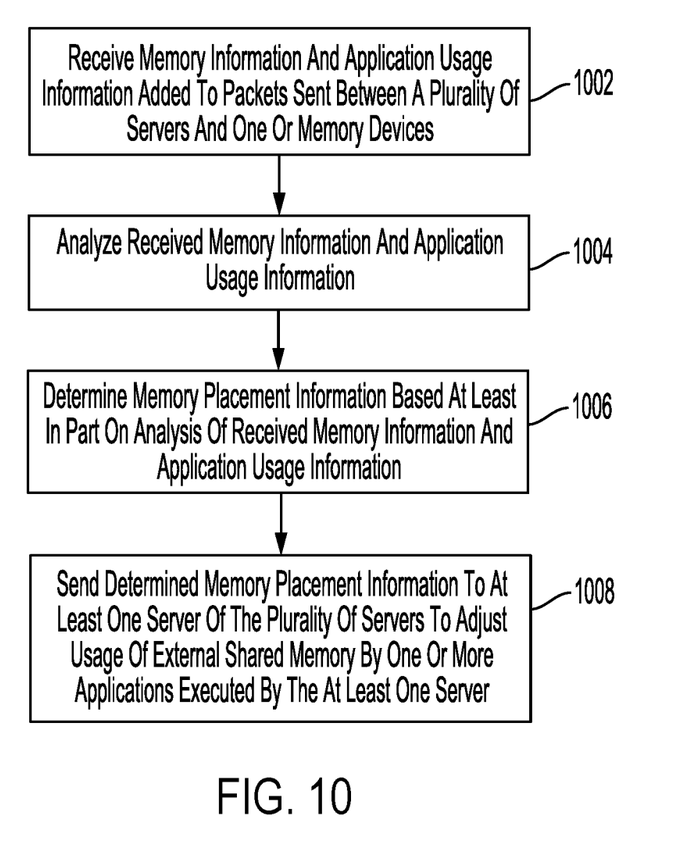
FIG. 10 is a flowchart for memory placement process performed by a memory access profiling server according to one or more embodiments.

FIG. 10 is a flowchart for memory placement process performed by a memory access profiling server according to one or more embodiments. The memory placement process of FIG. 10 may be performed by, for example, at least one processor 134 of memory access profiling server $120_A$ executing collection module 38 and memory placement module 32.

In block 1002, collection module 38 of the memory access profiling server receives memory information and application usage information added to packets sent between a plurality of servers and one or more memory devices. In some implementations, the memory access profiling server may periodically snoop on network traffic being sent by switches in the network (e.g., aggregated switches 104 and core switches 106 in FIG. 1) to identify application usage information and memory information added to packets for memory requests being sent from servers and data being returned from memory devices. The memory access profiling server may use source identifiers in the packet to identify the server or memory device sending the application usage information or memory information. The source identifiers in some implementations may be correlated with addresses in network information stored by the memory access profiling server. The collected application usage information and memory information may be locally stored by the memory access profiling server, such as in application usage information 34 and memory information 36 in FIG. 2.

In block 1004, a memory placement module of the memory access profiling server analyzes the received memory information and application usage information. In some cases, the memory placement module may analyze the application usage information and memory information collected during a single epoch or period of time. In other cases, the memory placement module may additionally analyze the application usage information and memory information collected from one or more previous epochs or periods of time.

The memory placement module may identify particular applications that are starved for memory, such as through PSI for the application, and identify memory devices or servers offering shared memory that are underutilized as compared to higher usage shared memory located at other network devices, such as through an average queue length for the memory device.

In block 1006, the memory placement module determines memory placement information based at least in part on the analysis of the received memory information and application usage information. The memory placement information may provide more than one option for a substitute external shared memory based on the analyzed application usage information and memory information. In some implementations, the memory placement module may also determine memory placement information based on predictions of future memory usage. In such implementations, the memory placement module may input current application usage information and memory information into a function determined by ML to predict future patterns of memory access that may be used for determining the memory placement information. In such cases, the memory placement module may have trained weights for the function using previously collected application usage information and memory information, which may also form a part of application usage information 34 and memory information 36.

In block 1008, the memory access profiling server sends the determined memory placement information to at least one server to adjust usage of external shared memory by one or more applications executed by the at least one server. As discussed above, by using kernel modules of the servers, the memory usage adjustments do not interfere with the operation of the applications, which are unaware of the physical locations of the memory being used by the application. In some cases, the memory kernel module of the server may instead decide to use a local memory, which may or may not be a shared memory, in place of a change to an external shared memory substitution provided by the memory placement information. In such cases, the memory kernel module may determine that the use of the local memory will provide a better performance for the application than changing to the external shared memory indicated by the memory placement information received from the memory access profiling server.

The foregoing in-kernel modules for adjusting memory usage of applications can provide a faster and more dynamic memory allocation that is better suited to the changing demands of the applications and changing status of different memories in a system. By distributing the management of memory usage to each server in the system, it is ordinarily possible to better scale to larger systems that include different types of memory with different performance characteristics. In addition, the sharing of application usage information and memory information with memory access profiling servers can provide a cluster-wide or system-wide view of memory usage to provide memory placement information to the memory kernel modules of the servers that improves system-wide performance of applications by reducing memory bottlenecks and providing fairer memory resource sharing among applications in the system.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A server, comprising:
    at least one local memory;
    a network interface configured to communicate with one or more network devices via a network, wherein the one or more network devices provide external shared memory via the network; and
    at least one processor configured, individually or in combination, to:
        execute one or more memory kernel modules in a kernel space of the at least one local memory, the one or more memory kernel modules configured, individually or in combination, to:
            monitor memory usage by different applications executed by the at least one processor, the monitoring of memory usage including determining a frequency of memory access of at least one of the external shared memory and the at least one local memory by one or more applications executed by the at least one processor, and
            adjust usage of the at least one local memory and the external shared memory by the different applications executed by the at least one processor based, at least in part, on the monitored memory usage by the different applications executed by the at least one processor, wherein the adjusting of usage includes storing data for the one or more applications in the at least one local memory or in the external shared memory based on the determined frequency of memory access by the one or more applications.

2. The server of claim 1, wherein the at least one processor is further configured, individually or in combination, to use the one or more memory kernel modules, individually or in combination, to:
    obtain Pressure Stall Information (PSI) indicating time that a process of an application is stalled due to a lack of available memory; and
    adjust usage of the external shared memory based, at least in part, on the obtained PSI.

3. The server of claim 1, wherein the at least one processor is further configured, individually or in combination, to use the one or more memory kernel modules, individually or in combination, to:
    determine that an application executed by the at least one processor no longer needs access to a portion of the external shared memory used by the application; and
    in response to determining that the application no longer needs access to the portion of the external shared memory, send an indication to a network device of the one or more network devices to release the portion of the external shared memory for use by other applications.

4. The server of claim 1, wherein the at least one processor is further configured, individually or in combination, to use the one or more memory kernel modules, individually or in combination, to:
    update memory access counters in the kernel space, wherein the one or more memory kernel modules are configured, individually or in combination, to update separate memory access counters for respective applications executed by the at least one processor; and
    adjust usage of the external shared memory by at least one application executed by the at least one processor based, at least in part, on the updated memory access counters.

5. The server of claim 4, wherein the memory access counters include separate read access counters and write access counters for the at least one application.

6. The server of claim 1, wherein the at least one processor is further configured, individually or in combination, to use the one or more memory kernel modules, individually or in combination, to:
    send a request via the network interface to a network device of the one or more network devices requesting memory information for a shared memory of the network device;
    receive the memory information from the network device; and
    determine whether to migrate data stored by the server in the shared memory of the network device based, at least in part, on the received memory information.

7. The server of claim 1, wherein the at least one processor is further configured, individually or in combination, to use the one or more memory kernel modules, individually or in combination, to:
    add application usage information to packets sent to the network via the network interface for use by at least one memory access profiling server on the network to analyze application usage information received from a plurality of servers on the network.

8. The server of claim 7, wherein the application usage information includes at least one of Pressure Stall Information (PSI) indicating time that a process of an application is stalled due to a lack of available memory, a read count for read requests generated by the application, a write count for write requests generated by the application, a bandwidth indicator for the application, and a latency indicator for the application.

9. The server of claim 1, wherein the at least one processor is further configured, individually or in combination, to use the one or more memory kernel modules, individually or in combination, to:
    receive, via the network interface, memory placement information from at least one memory access profiling server on the network; and
    adjust usage of at least one of the at least one local memory and the external shared memory by the different applications executed by the at least one processor based, at least in part, on the received memory placement information.

10. A method, comprising:
executing one or more memory kernel modules in a kernel space of at least one local memory of a server;
using the one or more memory kernel modules, individually or in combination, to monitor memory usage by different applications executed by the server;
adjusting usage of the at least one local memory and usage of external shared memory by the different applications executed by the server, wherein the external shared memory is provided by one or more network devices for the server via a network; and
adding application usage information to packets sent to the network for use by at least one memory access profiling server on the network to analyze application usage information received from a plurality of servers on the network.

11. The method of claim 10, further comprising:
obtaining Pressure Stall Information (PSI) indicating time that a process of an application is stalled due to a lack of available memory; and
adjusting usage of the external shared memory based, at least in part, on the obtained PSI.

12. The method of claim 10, further comprising:
determining that an application executed by the server no longer needs access to a portion of the external shared memory used by the application; and
in response to determining that the application no longer needs access to the portion of the external shared memory, sending an indication to a network device of the one or more network devices to release the portion of the external shared memory for use by other applications.

13. The method of claim 10, further comprising:
updating memory access counters in the kernel space of the server for respective applications executed by the server; and
adjusting usage of the external shared memory by at least one application executed by the server based, at least in part, on the updated memory access counters.

14. The method of claim 13, wherein the memory access counters include separate read access counters and write access counters for the at least one application.

15. The method of claim 10, further comprising:
determining a frequency of memory access by an application executed by the server; and
storing data for the application in the at least one local memory or in the external shared memory based on the determined frequency of memory access by the application.

16. The method of claim 10, further comprising:
sending a request to a network device of the one or more network devices to request memory information for a shared memory of the network device;
receiving the memory information from the memory device; and
determining whether to migrate the data stored in the shared memory of the network device based, at least in part, on the received memory information.

17. The method of claim 10, wherein the
application usage information includes at least one of Pressure Stall Information (PSI) indicating time that a process of an application is stalled due to a lack of available memory, a read count for read requests generated by the application, a write count for write requests generated by the application, a bandwidth indicator for the application, and a latency indicator for the application.

18. The method of claim 10, further comprising:
receiving memory placement information from at least one memory access profiling server on the network; and
adjusting usage of at least one of the at least one local memory and the external shared memory by the different applications executed by the server based, at least in part, on the received memory placement information.

19. A memory access profiling server, comprising:
a network interface configured to communicate with a plurality of servers and one or more memory devices on a network, wherein the one or more memory devices provide an external shared memory for the plurality of servers; and
means for:
receiving memory information and application usage information added to packets sent between the plurality of servers and the one or more memory devices;
analyzing the received memory information and application usage information;
determining memory placement information based, at least in part, on the analysis of the received memory information and the application usage information; and
sending the determined memory placement information to at least one server of the plurality of servers to adjust usage of the external shared memory by one or more applications executed by the at least one server.

20. The memory access profiling server of claim 19, wherein the received memory information and application usage information include at least one of an indication of availability of memory at the one or more memory devices, performance requirements of applications executed by the plurality of servers, and characteristics of shared memories at the one or more memory devices.

* * * * *